US008593955B2

(12) United States Patent  (10) Patent No.: US 8,593,955 B2
Yano et al.  (45) Date of Patent: Nov. 26, 2013

(54) PACKET RELAY DEVICE AND CONGESTION CONTROL METHOD

(75) Inventors: Hiroki Yano, Yokohama (JP); Keigo Uchizumi, Yokohama (JP); Hideki Hinosugi, Tokyo (JP)

(73) Assignee: Alaxala Networks Corporation, Kawasaki (JP)

( * ) Notice: Subject to any disclaimer, the term of this patent is extended or adjusted under 35 U.S.C. 154(b) by 85 days.

(21) Appl. No.: 13/190,908

(22) Filed: Jul. 26, 2011

(65) Prior Publication Data
US 2012/0033550 A1 Feb. 9, 2012

(30) Foreign Application Priority Data

Aug. 6, 2010 (JP) ................................ 2010-176853

(51) Int. Cl.
*H04L 12/26* (2006.01)
*H04L 12/28* (2006.01)
*H04Q 11/04* (2006.01)
*H04J 3/14* (2006.01)

(52) U.S. Cl.
USPC ........... 370/230; 370/231; 370/235; 370/412; 370/428

(58) Field of Classification Search
USPC .......................... 370/230–412, 428; 711/100
See application file for complete search history.

(56) References Cited

U.S. PATENT DOCUMENTS

| | | | | |
|---|---|---|---|---|
| 5,426,640 A | * | 6/1995 | Hluchyj et al. ............... | 370/235 |
| 5,541,912 A | * | 7/1996 | Choudhury et al. .......... | 370/412 |
| 5,719,853 A | * | 2/1998 | Ikeda ............................. | 370/229 |
| 5,940,375 A | * | 8/1999 | Soumiya et al. .............. | 370/249 |
| 6,009,078 A | | 12/1999 | Sato | |
| 6,021,116 A | * | 2/2000 | Chiussi et al. ................ | 370/236 |
| 6,144,636 A | * | 11/2000 | Aimoto et al. ................ | 370/229 |
| 6,262,986 B1 | * | 7/2001 | Oba et al. ...................... | 370/399 |
| 6,988,160 B2 | * | 1/2006 | Daniel et al. .................. | 710/310 |
| 7,061,862 B2 | * | 6/2006 | Horiguchi et al. ............ | 370/230 |
| 7,130,269 B2 | * | 10/2006 | Nie ............................... | 370/235 |

(Continued)

FOREIGN PATENT DOCUMENTS

| | | |
|---|---|---|
| JP | 07-087133 | 3/1995 |
| JP | 9-219706 | 8/1997 |

(Continued)

OTHER PUBLICATIONS

Analysis of Active Queue Management Jae Chung and Mark Claypool Computer Science Department Worcester Polytechnic Institute Worcester, MA 01609, USA.*

*Primary Examiner* — Afsar M Qureshi
(74) *Attorney, Agent, or Firm* — Foley & Lardner LLP

(57) ABSTRACT

A packet relay device is equipped with a buffer memory including a plurality of queues for temporarily storing packets, and a storage unit for storing the first queue lengths indicating the respective queue length of each of the queues and a second queue length indicating a value according to a total of the plurality of first queue lengths. When the packet relay device receives packets, it discerns the queue to which the received packet belongs from among the plurality of queues, and temporarily stores the packet in relation to the discerned queue within the buffer memory. Then, the first queue length and the second queue length are updated, and a determination is made of whether or not to send a congestion notification to the packet sending source according to the first queue length corresponding to the discerned queue, and to the second queue length.

11 Claims, 12 Drawing Sheets

(56) References Cited

U.S. PATENT DOCUMENTS

| | | | |
|---|---|---|---|
| 7,359,321 B1* | 4/2008 | Sindhu et al. | 370/230 |
| 7,684,422 B1* | 3/2010 | Sindhu et al. | 370/412 |
| 7,936,678 B2* | 5/2011 | Paloheimo et al. | 370/235 |
| 7,990,868 B1* | 8/2011 | Gallagher et al. | 370/235 |
| 2001/0009547 A1* | 7/2001 | Jinzaki et al. | 370/390 |
| 2002/0009082 A1* | 1/2002 | Matsuoka et al. | 370/390 |
| 2002/0071387 A1* | 6/2002 | Horiguchi et al. | 370/229 |
| 2002/0110137 A1* | 8/2002 | Nie | 370/429 |
| 2003/0018867 A1* | 1/2003 | Mora | 711/165 |
| 2003/0130832 A1* | 7/2003 | Schulter et al. | 703/23 |
| 2004/0170186 A1* | 9/2004 | Shao et al. | 370/412 |
| 2006/0171318 A1* | 8/2006 | Bergamasco et al. | 370/235 |
| 2007/0058534 A1* | 3/2007 | Shimonishi et al. | 370/230 |
| 2007/0064716 A1* | 3/2007 | Sachs et al. | 370/412 |
| 2007/0081454 A1* | 4/2007 | Bergamasco et al. | 370/229 |
| 2007/0091799 A1* | 4/2007 | Wiemann et al. | 370/230 |
| 2007/0183332 A1 | 8/2007 | Oh et al. | |
| 2007/0230435 A1* | 10/2007 | Anzai | 370/351 |
| 2009/0147676 A1* | 6/2009 | Shimonishi | 370/230 |
| 2009/0245104 A1* | 10/2009 | Nishimura et al. | 370/230 |
| 2009/0252035 A1* | 10/2009 | Fukunaga et al. | 370/230.1 |
| 2009/0262748 A1* | 10/2009 | Nakagawa | 370/412 |
| 2009/0300296 A1* | 12/2009 | Yasui et al. | 711/154 |
| 2010/0165846 A1 | 7/2010 | Yamaguchi | |
| 2011/0051604 A1* | 3/2011 | Nishimura | 370/235 |
| 2011/0128853 A1* | 6/2011 | Nishimura | 370/235 |

FOREIGN PATENT DOCUMENTS

| | | |
|---|---|---|
| JP | 10-173661 | 6/1998 |
| JP | 2007-215182 A | 8/2007 |
| WO | WO 2008/035600 A1 | 3/2008 |

* cited by examiner

Fig.5

| QUEUE NO. | MAX_TH(N) | CN_TH(N) | QLEN(N) |
|---|---|---|---|
| (N)#1 | 50 | 30 | 7 |
| (N)#2 | 80 | 50 | 14 |
| (N)#3 | 70 | 45 | 22 |
| (N)#4 | 100 | 80 | 90 |
| (N)#5 | 120 | 70 | 5 |
| ... | ... | ... | ... |
| (N)#999 | 70 | 50 | 0 |
| (N)#1000 | 60 | 45 | 8 |

| QUEUE NO. | MAX_TH$_{(N+1)}$ | MAX_CN_TH$_{(N+1)}$ | MIN_CN_TH$_{(N+1)}$ | STD_CP | QLEN$_{(N+1)}$ | QAVE |
|---|---|---|---|---|---|---|
| (N+1)#1 | 1000 | 800 | 500 | 50% | 700 | 700 |

| QUEUE # | MAX_TH$_{(N+1)}$ | TH#1 | TH#2 | TH#3 | TH#4 | QLEN$_{(N+1)}$ |
|---|---|---|---|---|---|---|
| (N+1)#1 | 1000 | 250 | 500 | 750 | 800 | 700 |

| COMMAND | DESCRIPTION |
|---|---|
| set_std_cp_M | SETS STANDARD CONGESTION NOTIFICATION PROBABILITY TO M |
| set_weight_S | SETS WEIGHTING FACTOR TO S |
| set_max_w_α | SETS CONGESTION NOTIFICATION WEIGHT TO α |
| set_max_th_w_β | SETS CONGESTION NOTIFICATION THRESHOLD VALUE WEIGHT TO β |
| set_class_num | SETS NUMBER OF CONGESTION CLASSES |
| set_class_N_M | SETS CONGESTION CLASS N THRESHOLD VALUE TO M |
| show_stat | DISPLAYS WEIGHT AND CLASS INFORMATION |
| clear_stat | CLEARS WEIGHT AND CLASS INFORMATION |

Fig.14

| COMMAND | DESCRIPTION |
|---|---|
| use_que_M | DECLARES USE OF M QUEUES AS THE N-th STAGE QUEUES |
| set_eq_buff_M | SETS MAXIMUM STORAGE THRESHOLD VALUE OF ALL THE N-th STAGE QUEUES TO M |
| set_range_buff_Q_L_M | SETS THE MAXIMUM STORAGE THRESHOLD VALUE TO M FOR THE N-th STAGE QUEUES FROM THE QUEUE NO. Q TO L |
| set_buff_Q_M | SETS THE MAXIMUM STORAGE THRESHOLD VALUE ALLOCATED TO THE N-th STAGE QUEUE OF THE QUEUE NO. Q TO M |
| set_eq_cn_th_Q_M | SETS THE CONGESTION NOTIFICATION THRESHOLD VALUE OF ALL THE N-th STAGE QUEUES TO M |
| set_range_cn_th_Q_L_M | SETS THE CONGESTION NOTIFICATION THRESHOLD VALUE TO M FOR THE N-th STAGE QUEUES OF FROM QUEUE NO. Q TO L |
| set_cn_th_Q_M | SETS THE CONGESTION NOTIFICATION THRESHOLD VALUE OF THE N-th STAGE OF THE QUEUE NO. Q TO M |
| set_max_th_M | SETS THE MAXIMUM CONGESTION NOTIFICATION THRESHOLD VALUE OF THE (N + 1)-th STAGE QUEUE TO M |
| set_min_th_M | SETS THE MINIMUM CONGESTION NOTIFICATION THRESHOLD VALUE OF (N + 1)-th STAGE QUEUE TO M |
| show_all_stat | DISPLAYS INFORMATION OF ALL THE QUEUES (MAXIMUM STORAGE THRESHOLD VALUE, CONGESTION NOTIFICATION THRESHOLD VALUE, QUEUE LENGTH) |
| show_range_stat_Q_L | DISPLAYS THE INFORMATION FROM THE Q-th TO THE L-th QUEUES |
| show_stat_Q | DISPLAYS THE INFORMATION OF THE Q-th QUEUE |
| clear_stat | CLEARS THE SET INFORMATION |

PACKET RELAY DEVICE AND CONGESTION CONTROL METHOD

CROSS-REFERENCE TO RELATED APPLICATION

The present application claims the priority based on Japanese Patent Application No. 2010-176853 filed on Aug. 6, 2010, the disclosure of which is hereby incorporated by reference in its entirety.

BACKGROUND

1. Technical Field

The present invention relates to a technology for performing congestion control with a packet relay device.

2. Related Art

As a relay device for performing relay of packets or frames on a network, for example, routers, switches and the like are known. For this kind of relay device, when there is a communication request that greatly exceeds the allowed capacity, there are cases when communication becomes stagnated in the relay device interior. This kind of phenomenon is typically called "congestion." Regardless of the network scale, this is a phenomenon that can occur with a LAN, WAN, the internet or the like.

As technology for suppressing this kind of congestion, for example, there is the technology noted in JP-A-1998-0173661. With this technology, a judgment is made of whether or not the value of a FIFO length counter for monitoring the number of packets buffered in the overall FIFO memory has exceeded a specified threshold value. Then, when the value of this FIFO length counter does exceed the threshold value, control is performed to uniformly reduce the threshold value for monitoring the number of packets prepared individually for each connection. With this kind of control, notification to the effect that congestion has occurred is given to sending source terminals connected to connections with a larger number of buffered packets than the reduced threshold value. When the sending source terminal receives this notification, it can reduce the packet sending volume. Because of this, the packets received from that connection are decreased from FIFO memory, and it is possible to suppress the occurrence of congestion.

However, with the technology disclosed in JP-A-1998-0173661, because the threshold values prepared for each connection are reduced uniformly, notification to the effect that congestion has occurred is given to all the sending source terminals connected to connections with a higher number of buffered packets than the reduced threshold value. When this happens, because the packet sending volume is simultaneously reduced by all of those sending source terminals, there are cases when there is a sudden decrease in the overall network throughput. This kind of problem is not restricted to packets but rather is a problem that can occur in common with devices that perform relay of data flowing on a communication line such as a network or the like.

Consequently, there is a need for a congestion control technology capable of suppressing a decrease in overall network throughput.

SUMMARY

According to an aspect of the present invention, there is provided a packet relay device comprising: a buffer memory containing a plurality of queues in which packets are temporarily stored; a storage unit in which a plurality of first queue lengths respectively indicating a queue length of each of the queues and a second queue length indicating a value according to a total of the plurality of first queue lengths are stored; a receiving unit configured to receive packets; a queue discerning unit configured to discern a queue to which the packet belongs from among the plurality of the queues; a queue management unit configured to temporarily store the packets in relation to the discerned queue within the buffer memory, and to update the first queue length and the second queue length; a congestion notification determination unit configured to determine whether or not to send a congestion notification to a sending source of the received packet according to the first queue length corresponding to the discerned queue and to the second queue length; and a congestion notification sending unit configured to send the congestion notification to the sending source.

According to this aspect of the invention, because a judgment is made of whether congestion notification is performed to the sending source of that packet based on the first queue length of the queue to which the received packet belongs, and to the second queue length indicating the value according to the total of a plurality of first queue lengths, it is possible to perform individual congestion control respectively for each item of the plurality of queues. Thus, it is possible to suppress a decrease in the overall network throughput in accordance with the congestion control.

The congestion notification determination unit may find a congestion notification probability for which the probability becomes higher the longer the first queue length is, and the probability becomes higher the longer the second queue length is based on a specified arithmetic expression, and may determine whether or not to send a congestion notification to the sending source of the received packet based on that congestion notification probability. According to this feature, it is possible to increase the probability of performing congestion notification to the sending source of packets the longer the first queue length is, and it is possible to increase the probability of performing congestion notification to the sending source of packets the longer the second queue length is. Because of that, it is possible to find the probability for performing congestion notification according to the overall queue length within the buffer memory (second queue length) and to the individual queue length of each queue (first queue length).

the congestion notification determination unit may make the congestion notification probability 0% regardless of the arithmetic expression when the second queue length is a preset first threshold value or less, and may make the congestion notification probability 100% regardless of the arithmetic expression when the second queue length is a preset second threshold value or greater. According to this feature, it is not necessary to calculate the congestion notification probability when the congestion notification clearly becomes necessary or when the congestion notification is clearly unnecessary, so it is possible to simplify the process.

The packet relay device may further comprise a first setting unit configured to set the arithmetic expression or the constants contained in the arithmetic expression. According to this feature, it is possible to perform flexible congestion control according to the status of the network on which the packet relay device is placed or on the usage status.

The congestion notification determination unit may classify the received packets into classes according to the first queue length, and may determine whether or not to send the congestion notification to the sending source of the received packet based on a preset threshold value for each of the classes and on the second queue length. According to this feature, it is possible to determine whether or not to perform congestion notification simply by comparing the second queue length with a preset threshold value according to the first queue length, so it is possible to perform individual congestion control for the respective plurality of queues while reducing the processing load of the packet relay device.

The packet relay device may further comprise a second setting unit configured to set the threshold value for each of the classes. According to this feature, it is possible to perform flexible congestion control according to the status of the network on which the packet relay device is placed or on the usage status.

The storage unit may store the first queue length and the second queue length by the number of packets or data volume. According to this feature, it is possible to select the unit of the first queue length and the second queue length according to the status of the network on which the packet relay device is placed or on the usage status.

The congestion notification determination unit may determine a congestion level according to the second queue length, and the congestion notification sending unit may include the determined congestion level in the congestion notification. According to this feature, it is possible to provide useful information for performing congestion control to a packet sending source which has received congestion notification.

The congestion level may be used for restricting the packet sending volume at the sending source. According to this feature, the packet sending source can easily perform congestion control using the congestion notification received from the packet relay device.

A total capacity of the buffer memory may be lower than a total of the queue lengths of the plurality of the queues. According to this feature, it is possible to perform packet queuing effectively using a small capacity buffer memory based on the statistical multiplexing effect.

In addition to a constitution as the packet relay device described above, the present invention can also have a constitution as a congestion control method or computer program product. The computer program can be recorded on a computer readable recording medium. As the recording medium, for example, it is possible to use various media such as a flexible disk, a CD-ROM, a DVD-ROM, a magnetic optical disk, a memory card, a hard disk or the like.

BRIEF DESCRIPTION OF THE DRAWINGS

FIG. 5 is an explanatory drawing showing an example of a first congestion control table;

FIG. 6 is an explanatory drawing showing an example of a second congestion control table;

FIG. 10 is an explanatory drawing showing an example of a second congestion control table with the second embodiment;

FIG. 13 is an explanatory drawing showing commands for performing settings related to the operation of the congestion notification determination unit; and FIG. 14 is an explanatory drawing showing a command for performing settings of the first congestion control table and the second congestion control table.

DETAILED DESCRIPTION

Modes of carrying out the present invention will be described below based on preferred embodiments in the following sequence.
A. First Embodiment:
 A-1. Device Constitution:
 A-2. Congestion Control Process:
 A-3. First Congestion Determination Process:
 A-4. Second Congestion Determination Process:
B. Second Embodiment:
C. Third Embodiment:
D. Fourth Embodiment:
E. Variations:

A. First Embodiment

A-1. Device Constitution

Figure 1:
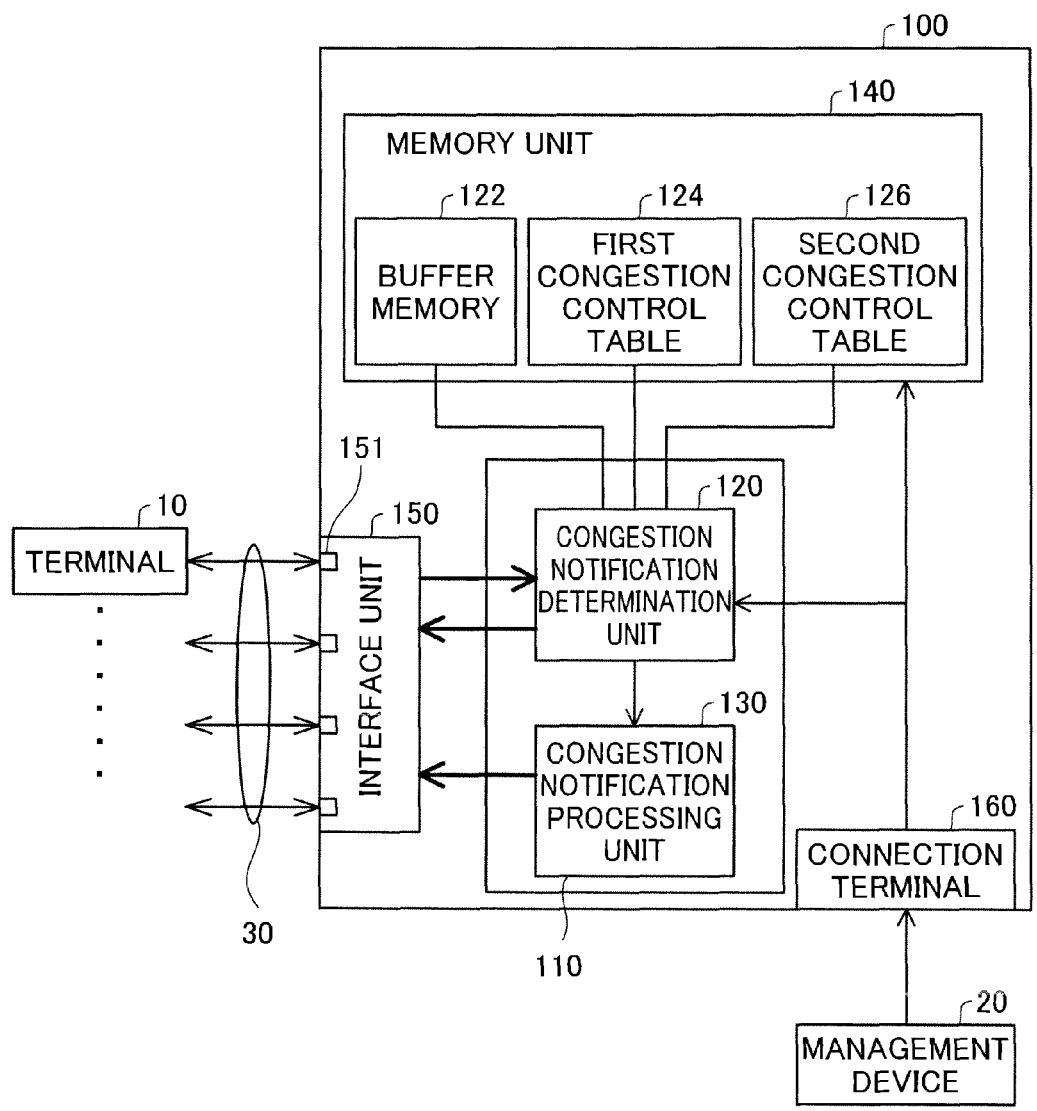
FIG. 1 is an explanatory drawing showing the schematic constitution of a packet relay device.

FIG. 1 is an explanatory drawing showing the schematic constitution of a packet relay device 100 as an embodiment of the present invention. The packet relay device 100 of this embodiment is equipped with a buffer memory 122 for temporarily storing packets received from each terminal 10 via a network line 30. The packet relay device 100 manages the packets stored within the buffer memory 122 in stages using a plurality of stages of queues including queues prepared for each packet flow and queues that do general management of these queues. In other words, the packet relay device 100 of this embodiment adopts a multi-stage queue structure using a shared buffer method. The shared buffer method is a method for which the buffer memory 122 with a capacity lower than the sum of the capacities of each queue is shared by all the queues based on the statistical multiplexing effect. With this kind of shared buffer method, it is acceptable to not prepare buffer memory 122 of a capacity of the sum portion of the capacities of each queue, so it is possible to make the capacity of the buffer memory lower, making it possible to cut back the parts costs and to realize a reduction in the power consumption. Following, we will describe the queues prepared for each packet flow as "N-th stage queues" and describe the queue that generally manages these queues as the "(N+1)-th stage queue."

The packet relay device 100 is equipped with a control unit 110, a memory unit 140, an interface unit 150, and a connection terminal 160. The control unit 110 is constituted as a computer equipped with a CPU, RAM and ROM. The CPU of the control unit 110 functions as the congestion notification determination unit 120 and the congestion notification processing unit 130 by loading into RAM a specified control program stored in ROM and running it. Note that the congestion notification determination unit 120 and the congestion notification processing unit 130 can also be realized using ASIC (Application Specific Integrated Circuit) or FPGA (Field Programmable Gate Array).

The memory unit 140 has the buffer memory 122 in which the packets are stored, the first congestion control table 124 for performing congestion control on the N-th stage queue, and the second congestion control table 126 for performing congestion control on the (N+1)-th stage queue. The control information recorded in these tables will be described in detail later.

The interface unit 150 is equipped with a plurality of physical ports 151. A terminal 10 and other packet relay devices are connected via the network line 30 to each physical port 151.

The congestion notification determination unit 120 receives packets through the interface unit 150, and discerns the flow of that packet based on the header information of that packet. Then, the packet is stored in the queue (N-th stage queue) within the buffer memory 122 corresponding to the discerned flow. At this time, the congestion notification determination unit 120 performs updating of the first congestion control table 124 and the second congestion control table 126. The specific updating method will be described later. The congestion notification determination unit 120 also has the function of transferring the packet sent based on a specified scheduling method from each queue (N-th stage queue) within the buffer memory 122 to that packet's sending destination through the interface unit 150.

The congestion notification determination unit 120 judges whether or not to perform congestion notification to the sending source of the received packet based on the control information recorded in the first congestion control table 124 and the second congestion control table 126. Congestion notification means performing notification to the sending source of the packet so as to perform control to suppress the occurrence of congestion. When the congestion notification determination unit 120 decides to perform congestion notification, it sends congestion information which includes the address of the sending source of that packet and information expressing the congestion status (level of congestion) to the congestion notification processing unit 130. Note that the congestion notification determination unit 120 correlates to the "queue discerning unit," the "queue management unit," and the "congestion notification determination unit" of this application.

Figure 2:
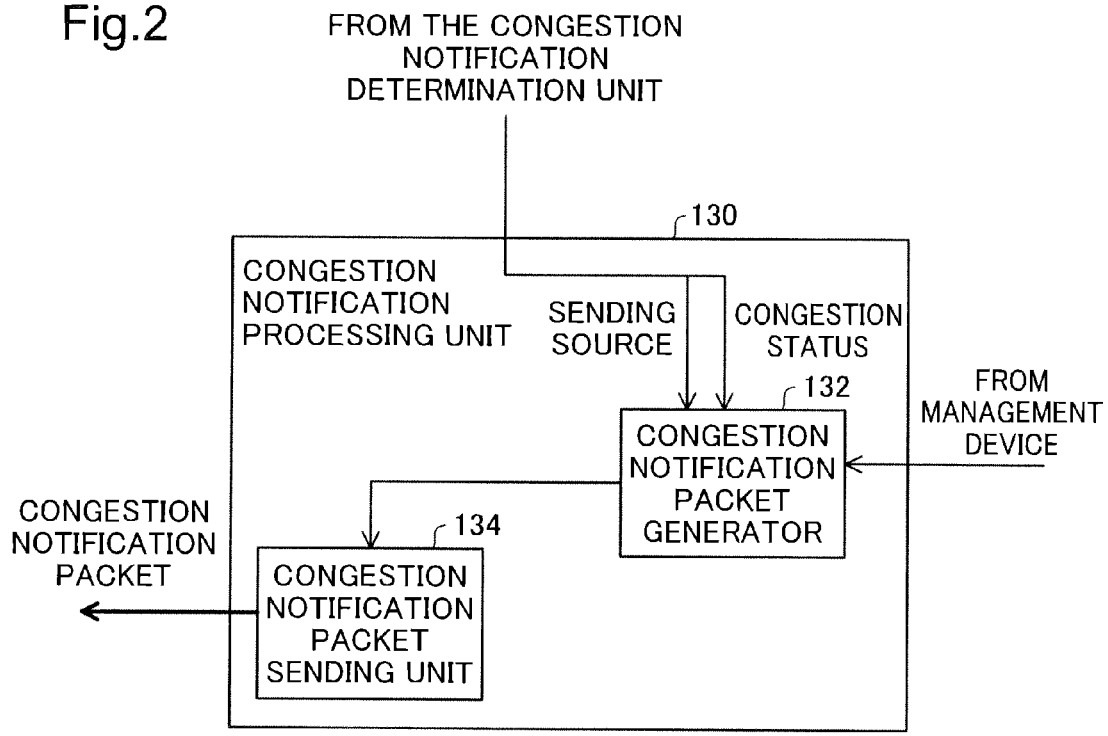
FIG. 2 is an explanatory drawing showing the detailed constitution of a congestion notification processing unit.

FIG. 2 is an explanatory drawing showing the detailed constitution of the congestion notification processing unit 130. The congestion notification processing unit 130 is equipped with a congestion notification packet generator 132 and a congestion notification packet sending unit 134. The congestion notification packet generator 132 generates packets for performing congestion notification (congestion notification packets) based on congestion information received from the congestion notification determination unit 120. This congestion notification packet includes information indicating the packet sending destination address and the congestion status. The congestion notification packet sending unit 134 sends an address corresponding to this congestion notification packet through the interface unit 150. The sending source of the packet which received the congestion notification packet limits the packet sending volume according to the notified level of congestion.

A management device 20 is connected to the connection terminal 160 (FIG. 1) via a specified cable. Connected to the management device 20 are a display device such as a display or the like, and an input device such as a keyboard, mouse or the like. The user who manages the packet relay device 100 (hereafter referred to as "management user") is able to perform various settings on the concerned packet relay device using this management device 20. A specific example of the setting contents will be described later. As the interface that connects the connection terminal 160 and the management device 20, it is possible to use items of various standards. For example, it is possible to use a serial interface, a LAN interface, a USB interface or the like.

Figure 3:
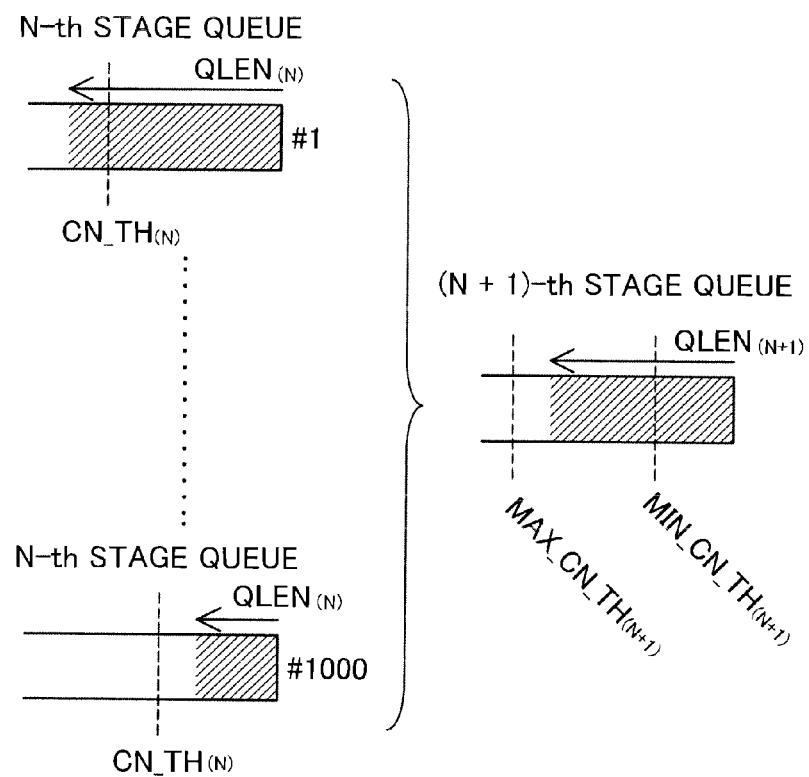
FIG. 3 is an explanatory drawing showing the concept of a multi stage queue structure.

FIG. 3 is an explanatory drawing showing the concept of the multi-stage queue structure of this embodiment. This FIG. 3 shows an example in which 1,000 queues exist at the N-th stage. With this embodiment, the plurality of N-th stage queues are not limited to packet flows, but can also be correlated individually to the packet sending source user or the physical port 151. In specific terms, for example, it is possible to use queuing for which packets from a certain user A are always stored in the N-th stage queue #1, or for which packets from a certain user Z are always stored in N-th stage queue #1000.

With this embodiment, a shared buffer method multi-stage queue structure that uses the statistical multiplexing effect is adopted. Because of that, the total of the packet count stored respectively in the N-th stage queue is managed by the (N+1)-th stage queue. In specific terms, the (N+1)-th stage queue's current queue length QLEN (N+1) becomes the total value of the current queue length QLEN (N) of the plurality of N-th stage queues. FIG. 3 shows the congestion notification threshold value CN_TH(N) for determining the congestion status with the N-th stage queues, the maximum congestion notification threshold value MAX_CN_TH(N+1) for determining the congestion status of the (N+1)-th stage queues, and the minimum congestion notification threshold value MIN_CN_TH(N+1). The use method for these threshold values will be described later.

A-2. Congestion Control Process

Figure 4:
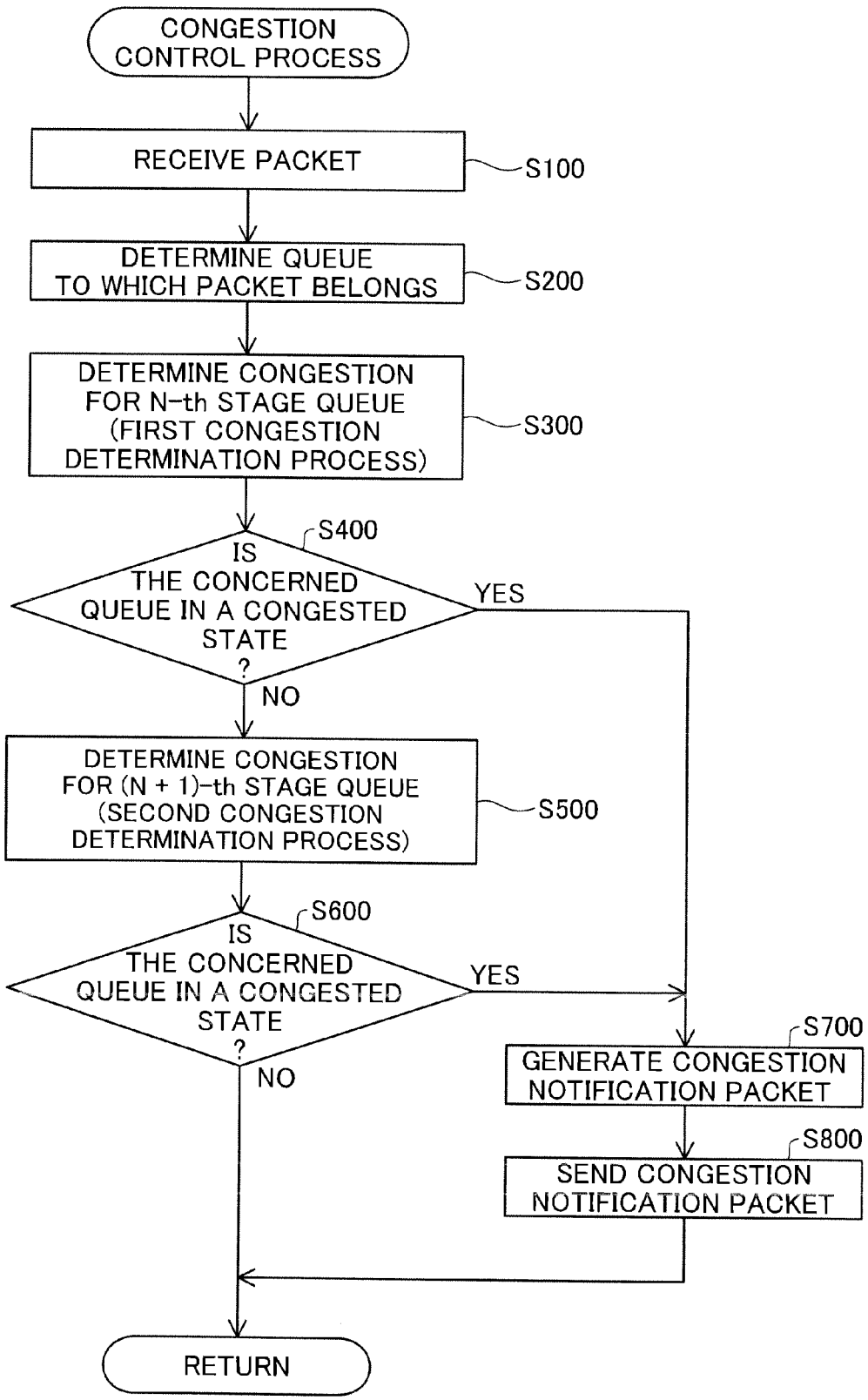
FIG. 4 is a flow chart of the congestion control process.

FIG. 4 is a flow chart of the congestion control process repeatedly executed by the packet relay device 100. This congestion control process is executed simultaneously and in parallel with the processing for the packet relay device 100 to perform packet queuing and relay. The process for performing packet queuing and relay is well known, so we will omit a description of these with this embodiment.

When execution of this congestion control processing starts, the congestion notification determination unit 120 receives packets through the interface unit 104 (step S100). Then, the congestion notification determination unit 120 analyzes the header information of the received packet and discerns the flow, and determines to which queue of the N-th stage queues that packet belongs (step S200).

When the congestion notification determination unit 120 determines the queue to which the packet belongs (N-th stage queue), it determines whether or not congestion has occurred in that queue (N-th stage queue) based on the control information recorded in the first congestion control table 124 in the memory unit 140 (step S300). Following, this determination process is called the first congestion determination process. This first congestion determination process will be described in detail later.

When it is determined by the first congestion determination process that congestion has occurred at the N-th stage queue (step S400: Yes), the congestion notification determination unit 120 notifies the congestion notification processing unit 130 of congestion information including information indicating the congestion level determined by the first congestion determination process and the address of the sending source of the packet received at step S100. When the congestion notification processing unit 130 receives this notification, it generates a congestion notification packet based on this notified congestion information (step S700), and sends that congestion notification packet to the sending source of the packet received at step S100 (step S800).

When it is determined by the first congestion determination process at the aforementioned step S300 that congestion has not occurred at the N-th stage queue (step S400: No), the congestion notification determination unit 120 executes the process of determining whether or not congestion has occurred at the (N+1)-th stage queue (hereafter referred to as the "second congestion determination process") (step S500) based on the control information recorded in the second congestion control table 126. This second congestion determination process will be described in detail later.

When it is determined that congestion has occurred at the (N+1)-th stage queue (step S600: Yes) by the second congestion determination process, the congestion notification determination unit 120 notifies the congestion notification processing unit 130 of the congestion information containing the level of congestion determined by the second congestion determination process and the information indicating the address of the sending source of the packet received at step S100. When the congestion notification processing unit 130 receives this notification, it generates a congestion notification packet (step S700) based on the notified congestion information, and sends that congestion notification packet to the sending source of the packet received at step S100 (step S800).

On the other hand, when it is determined that congestion has not occurred at the (N+1)-th stage queue by the second congestion determination process (step S600: No), the processes of steps S700 and S800 are skipped and the concerned congestion control process ends.

A-3. First Congestion Determination Process

FIG. 5 is an explanatory drawing showing an example of a first congestion control table 124 used with the first congestion determination process. For each N-th stage queue expressed by an individual queue number, a maximum storage threshold value MAX_TH(N) expressing the maximum packet count that can be stored in that queue, a congestion notification threshold value CN_TH(N) for determining whether or not to perform congestion notification, and a queue length QLEN(N) expressing the packet count currently stored in the concerned queue are recorded as control information in the first congestion control table 124.

The congestion notification determination unit 120 updates the first congestion control table 124 as follows. Specifically, the congestion notification determination unit 120 increases the queue length QLEN(N) of the applicable queue number of the first congestion control table 124 by one simultaneously with storage of the received packet in the concerned queue within the buffer memory 122. When packets are sent from a queue within the buffer memory 122 later, the queue length QLEN(N) of the concerned queue number of the first congestion control table 124 is decreased by one.

When the queue length QLEN(N) of the queue corresponding to the received packet is less than the congestion notification threshold value CN_TH(N) set for that queue with the first congestion determination process described above, the congestion notification determination unit 120 determines that congestion has not occurred at the concerned queue. Meanwhile, when the queue length QLEN(N) corresponding to the received packet is the congestion notification threshold value CN_TH(N) or greater, the congestion notification determination unit 120 determines that congestion has occurred at the concerned queue.

For example, with the example shown in FIG. 5, with queue number #4, the queue length QLEN(N) is "90," and exceeds the congestion notification threshold value CN_TH(N) of "80," so the congestion notification determination unit 120 determines that congestion has occurred at the concerned queue. Meanwhile, for the other queues, all the queue lengths QLEN(N) are less than each congestion notification threshold value CN_TH(N), so the congestion notification determination unit 120 determines that congestion has not occurred for the other queues. When it determines that congestion has occurred, the congestion notification determination unit 120 finds the queue length QLEN(N) ratio in relation to the congestion notification threshold value CN_TH(N), and determines the level of congestion according to that ratio. The level of congestion can be determined as, for example "light congestion" or "heavy congestion" based on the specified table.

A-4. Second Congestion Determination Process

FIG. 6 is an explanatory drawing showing an example of the second congestion control table 126 used with the second determination process. Recorded as control information in the second congestion control table 126 are the (N+1)-th stage queue number (one with this embodiment), the maximum storage threshold value MAX_TH(N+1) expressing the maximum packet count that can be stored in the (N+1)-th stage queue (specifically, the entire buffer memory 122), the maximum congestion notification threshold value MAX_CNN+1) indicating the queue length for which congestion notification will be performed to the sending source of all the packets sent to the queue, the minimum congestion notification threshold value MIN_CN_TH(N+1) indicating the upper limit of the queue length for which congestion notification is not performed, the standard congestion notification probability STD_CP that is the standard of the probability of congestion notification being performed when the average queue length QAVE described later reaches the maximum congestion notification threshold value MAX_CN_TH(N+1), the queue length QLEN(N+1) indicating the total packet count stored in the plurality of N-th stage queues, and the average queue length QAVE indicating the average value of the queue length QLEN (N+1) that varies over time. FIG. 6 shows an example with which recorded for the maximum storage threshold value MAX_TH(N+1) is 1000, for the maximum congestion notification threshold value MAX_CN_TH(N+1) is 800, for the minimum congestion notification threshold value MIN_CN_TH(N+1) is 500, for the standard congestion notification probability STD_CP is 50%, for the queue length QLEN(N+1) is 700, and for the average queue length QAVE is 700. Note that with this embodiment, because a shared buffer method using the statistical multiplexing effect is adopted, the maximum storage threshold value MAX_TH(N+1) of the (N+1)-th stage queue is a value that is lower than the total value of the maximum storage threshold MAX_TH(N) of the N-th stage queue shown in FIG. 5.

The congestion notification determination unit 120 updates the second congestion control table 126 as follows. Specifically, the congestion notification determination unit 120, simultaneously with storing received packets in the corresponding N-th stage queue within the buffer memory 122, increases the queue length QLEN(N+1) within the second congestion control table 126 by one, and also, using the method described later, performs updating of the average queue length QAVE. When a packet is sent later from within the buffer memory 122, the congestion notification determination unit 120 decreases the queue length QLEN(N+1)

within the second congestion control table 126 by one, and also performs updating of the average queue length QAVE.

Figure 7:
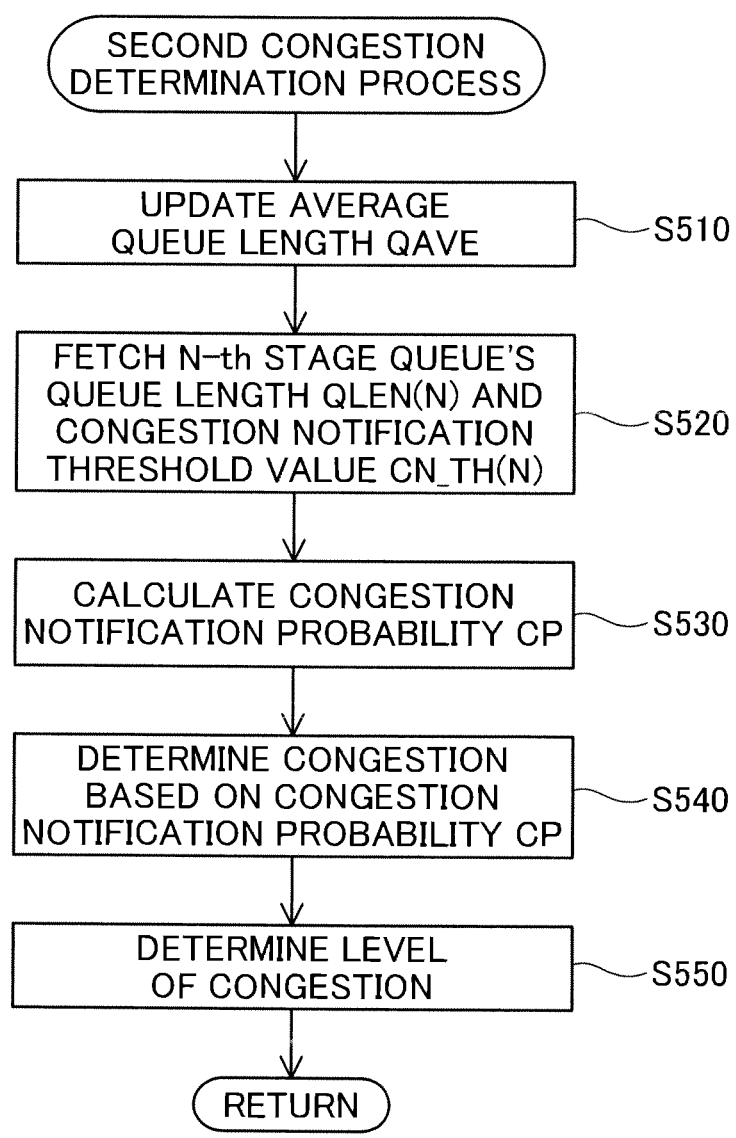
FIG. 7 is a flow chart of the second congestion determination process.

FIG. 7 is a flow chart showing the detailed processing contents of the second congestion determination process. When this second congestion determination process starts, the queue length QLEN(N+1) of the second congestion control table 126 is updated along with receiving of the packets, so the congestion notification determination unit 120 first updates the average queue length QAVE of the second congestion control table 126 (step S510). After updating, the average queue length QAVEnew can be found using the following formula (1) based on the current queue length QLEN (N+1) and the average queue length QAVEold before updating.

$$QAVEnew=\{QLEN(N+1)*\tfrac{1}{2}\hat{}S\}+\{QAVEold*(1-\tfrac{1}{2}\hat{}S)\} \quad (1)$$

(Here, S is a weighting factor greater than 0.)

With the formula noted above, with this embodiment, the larger the weighting factor S, the less the effect of the current queue length QLEN(N+1) on the average queue length QAVEnew after updating. Specifically, if the weighting factor S is made large, even if the current queue length QLEN(N+1) varies greatly within a short time, it is possible to make the variation of the average queue length QAVE small.

Next, the congestion notification determination unit 120 fetches the queue length QLEN(N) of the N-th stage queue to which the received packet belongs and the congestion notification threshold value CN_TH(N) from the first congestion control table 124 (step S520). When the queue length QLEN (N) and the congestion notification threshold value CN_TH (N) are fetched from the first congestion control table 124, the congestion notification determination unit 120 calculates the congestion notification probability CP (step S530) based on the fetched queue length QLEN(N) the congestion notification threshold value CN_TH(N), and the control information recorded in the second congestion control table 126. With this calculation process, for the congestion notification probability CP, a different value is used for each queue (N-th stage queue) to which the received packet belongs.

Figure 8:
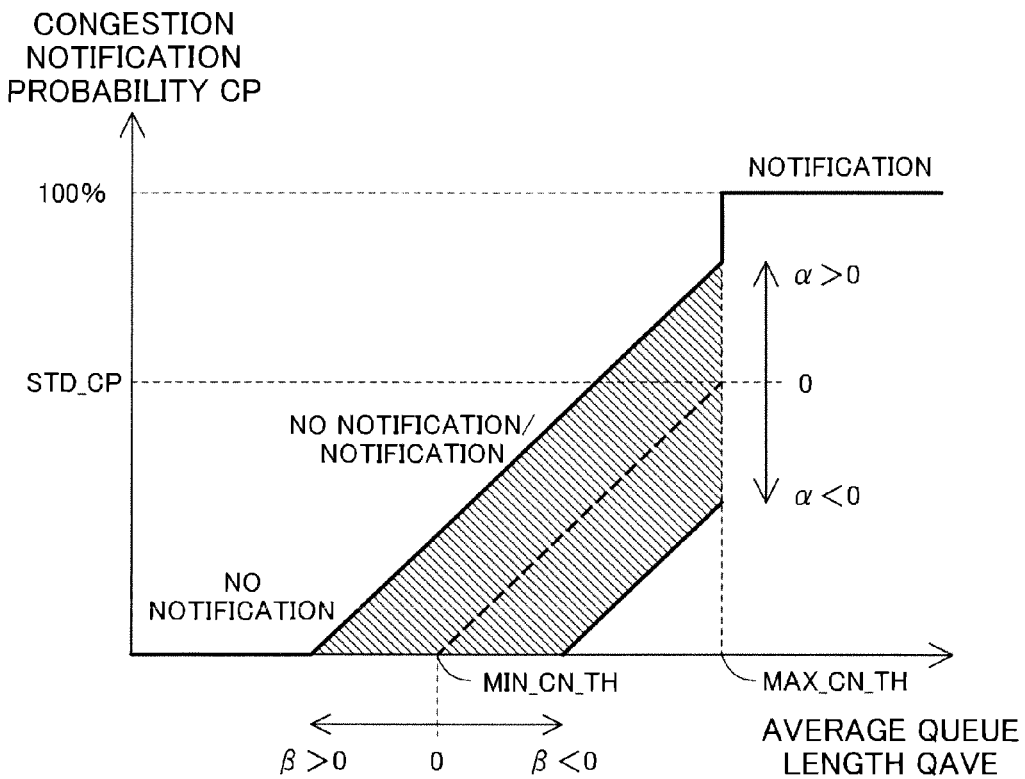
FIG. 8 is an explanatory drawing showing the concept of the calculation method for the congestion notification probability using a graph.

FIG. 8 is an explanatory drawing showing the concept of the congestion notification probability CP calculation method using a graph. The congestion notification determination unit 120, when calculating the congestion notification probability CP, first divides into arithmetic expression cases according to the average queue length QAVE calculated at step S510, the maximum congestion notification threshold value MAX_CN_TH(N+1) recorded in the second congestion control table 126, and the minimum congestion notification threshold MIN_CN_TH(N+1). In specific terms, division of cases is performed as with (A), (B), and (C) below. Then, the congestion notification probability CP is calculated based on formulas (2) through (4) shown below according to each case. FIG. 8 shows the range of values that can be obtained for the congestion notification probability calculated in this way shown by solid lines and cross hatching.

(A) When QAVE≥MAX_CN_TH(N+1): CP=100%  (2)

(B) When QAVE≤MIN_CN_TH(N+1)−β: CP=0%  (3)

(C) When MIN_CN_TH(N+1)−
β<QAVE<MAX_CN_TH(N+1): CP=(STD_CP+
α) (QAVE−MIN_SN_TH(N+1)+β)/
(MAX_CN_TH(N+1)−MIN_CN_TH(N+1)+β)  (4)

(Here, α is a congestion notification probability weight, and β is a congestion notification threshold value weight.)

As shown in FIG. 8, the congestion notification probability CP when the average queue length QAVE matches the maximum congestion notification threshold value MAX_CN_TH (N+1) becomes larger than the standard congestion notification probability the larger that the absolute value becomes when the congestion notification probability weight α is a positive value. On the other hand, the congestion notification probability CP when the average queue length QAVE matches the maximum congestion notification threshold value MAX_CN_TH(N+1) becomes smaller than the standard congestion notification probability STD_CP the larger the absolute value becomes when the congestion notification probability weight α is a negative value.

When the congestion notification threshold value β is a positive value, the greater the absolute value is, the smaller the threshold value at which congestion notification starts compared to the minimum congestion notification threshold value MIN_CN_TH(N+1). On the other hand, when the congestion notification threshold value weight β is a negative value, the greater the absolute value is, the larger the threshold value at which congestion notification starts compared to the minimum congestion notification threshold value MIN_CN_TH(N+1). Specifically, with this embodiment, the relationship between the congestion notification probability CP for which it is determined that the (N+1)-th stage queue is in a congested state and the average queue length QAVE varies according to the congestion notification probability weight α and the congestion notification threshold value weight β.

Note that the congestion notification probability weight cc and the congestion notification threshold value weight β can be found using formulas (5) and (6) below based on the N-th stage queue's queue length QLEN(N) and the maximum storage threshold value MAX_TH(N) corresponding to the received packet. Note that the calculation method of the congestion notification probability weight α and the congestion notification threshold value weight β is not limited to the formulas shown below, but can also use a variety of methods.

$$\alpha=\alpha MAX*\{QLEN(N)/MAX\_TH(N)*2-1\} \quad (5)$$

$$\beta=\beta MAX*\{QLEN(N)/MAX\_TH(N)*2-1\} \quad (6)$$

(Here, αMAX and βMAX are specified constants.)

With the aforementioned formulas (5) and (6), the greater the ratio of the queue length QLEN(N) occupied by the maximum congestion notification threshold value MAX_TH(N) of the N-th stage queue to which the received packet belongs, the greater the congestion notification probability weight α and the congestion notification threshold value weight β. Because of that, the greater the ratio of the queue length QLEN(N) occupied by the maximum congestion notification threshold value MAX_TH(N) of the N-th stage queue to which the received packet belongs, the higher the probability (congestion notification probability CP) for which it is determined that congestion has occurred with the (N+1)-th stage queue.

Note that it is possible make it so that the formula (5) αMAX value and the formula (6) βMAX value as well as the formula (1) weighting factor S value can be set to any value by the management device 20 connected to the connection terminal 160. By doing this, it is possible for the management user to freely set and change the range of variation of the congestion notification probability weight a and the congestion notification threshold value weight β as well as the weighting factor S. For example, the management user can suitably adjust the range of variation of the congestion notification probability weight α and the congestion notification threshold value weight β as well as the weighting factor S to match the number of users connected to the packet relay device 100, the communication volume, etc. The αMAX and βMAX values and the weighting factor S can also be selected by the management user from among a plurality of values prepared in advance. The management user can also use the management device 20 to freely set each of the values set in the first congestion control table 124 and the second congestion control table 126.

When congestion notification probability CP is calculated as described above, the congestion notification determination unit 120 determines whether or not congestion has occurred in the (N+1)-th stage queue (said another way, the entire buffer memory 122) (step S540) based on the calculated congestion notification probability CP. In specific terms, as shown in FIG. 6, let's assume that the maximum storage threshold value MAX_TH(N+1) is 1000, the maximum congestion notification threshold value MAX_CN_TH(N+1) is 800, the minimum congestion notification threshold value MIN_CN_TH(N+1) is 500, the standard congestion notification probability STD_CP is 50%, the queue length QLEN(N+1) is 700, the average queue length QAVE is 700, the constant αMAX is 40%, and the constant βMAX is 400. In this case, when the queue length QLEN(N) of the N-th stage queue to which the packet belongs is 3/4 of the maximum storage threshold MAX_TH(N), the congestion notification probability α is calculated as 20% and the congestion notification threshold weight β as 200. Also, because the average queue length QAVE of the (N+1)-th stage queue is 700, the congestion notification probability CP for the (N+1)-th stage queue of the concerned packet is calculated at 56%. Because of this, at the aforementioned step S540, at a probability of 56%, the determination is that congestion has occurred. In addition, for example, when the queue length QLEN(N) of the N-th stage queue to which the packet belongs is ⅛ of the maximum storage threshold value MAX_TH(N), the congestion notification probability weight a is calculated at −30%, and the congestion notification threshold value weight β at −300. Also, because the average queue length QAVE of the (N+1)-th stage queue is 700, the congestion notification probability CP for the (N+1)-th stage queue of the concerned packet is 0%. Because of that, at the aforementioned step S540, it is determined that congestion has not occurred at the concerned queue.

When done as described above and a determination is made of whether or not congestion has occurred at the (N+1)-th stage queue, next, the congestion notification determination unit 120 finds the ratio of the average queue length QAVE (can also be queue length QLEN(N+1)) in relation to the maximum congestion notification threshold value MAX_CN_TH(N+1), and the same as with the first congestion determination process, the level of congestion is determined according to this ratio (step S550). With the series of processes described above, the second congestion determination process ends, and the process returns to the congestion control process of FIG. 4.

With the first embodiment described above, of the plurality of N-th stage queues, while the congestion notification probability CP becomes greater in relation to N-th stage queues for which there is a high number of packets stored in the buffer memory 122, the congestion notification probability CP becomes smaller in relation to N-th stage queues which have a small number of packets stored in the buffer memory 122. In other words, with this embodiment, for each N-th stage queue, the probability of performing congestion notification varies dynamically according to the queue length. Because of that, even if the number of packets of a specified queue of the N-th stage increases, the congestion notification probability CP becomes large individually for that queue, so it is possible to selectively perform congestion notification to the sending source that sent the packet to that specified queue. By doing this, with congestion control based on latter stage queues, it is possible to have control that reflects each queue status at the previous stage, and it is possible to appropriately restrict communication from sending sources that are the cause of congestion. As a result, since no restrictions are applied as far as to the sending sources which are not the cause of congestion, it is possible to suppress a decrease in the overall network throughput. In other words, with this embodiment, it is possible to suppress occupation of the shared buffer by a specific queue, and to suppress inhibition of communication with other queues not being able to use the shared buffer. It is also possible to suppress power consumption because the sending source that received the congestion notification is able to suppress communication volume according to the notified congestion status.

Note that with this embodiment, as shown in FIG. 4, the first congestion determination process is executed for the N-th stage queue, and the second congestion determination process is executed for the (N+1)-th stage queue. However, it is also possible to omit execution of the first congestion determination process. In this case as well, simply by executing the second congestion determination process, the packet relay device 100 operates as if individual congestion control in stages is performed by all the queues. It is also possible to use the queue length QLEN(N+1) instead of the average queue length QAVE for calculation of the congestion notification probability CP with the second congestion determination process.

B. Second Embodiment

Figure 9:
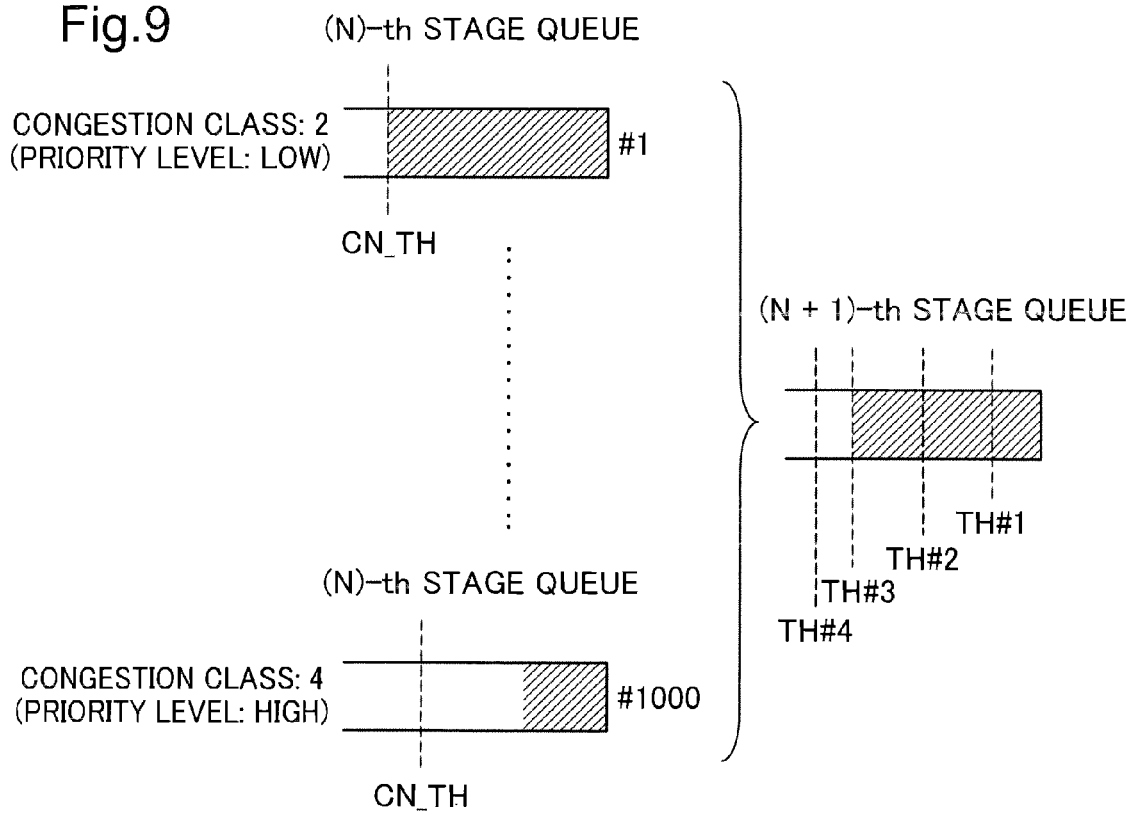
FIG. 9 is an explanatory drawing showing the concept of a multi stage queue structure with the second embodiment.

FIG. 9 is an explanatory drawing showing the concept of a multi stage queue structure with the second embodiment. The difference from the first embodiment described above is the point that the concept of "congestion class" is used for the congestion notification determination for the (N+1)-th stage queue, and the processing contents of the first congestion determination process executed for the N-th stage queue and the constitution are the same as for the first embodiment.

The "congestion class" shown in FIG. 9 is an item that classifies the priority level of packets stored in that queue according to the status of the N-th stage queue (specifically, queue length QLEN(N)) to which the received packet belongs. With this embodiment, when the received packet is classified as high priority level, control is performed to make it more difficult for congestion notification to be given to the packet sending source, and when it is classified as low priority level, it is performed to make it easier for congestion notification to be given to the packet sending source. In other words, with this embodiment, there is variation of how easy it is for congestion notification to be given to the packet sending source according to the classified congestion class.

For example, in the case of FIG. 9, the queue length QLEN(N) of the N-th stage queue #1000 is relatively short, so the congestion notification determination unit 120 allocates the packets belonging to the N-th stage queue #1000 to high priority level congestion class 4. On the other hand, the queue length QLEN(N) of the N-th stage queue #1 is relatively long, so the congestion notification determination unit 120 allocates the packets belonging to the N-th stage queue #1 to low priority level congestion class 2. Specifically, by the packets belonging to the N-th stage queue with the long queue length QLEN(N) being classified in the low priority level congestion class, the possibility of a queue being determined to be in a congested state with the second congestion determining process for the (N+1)-th stage queue becomes higher. By doing this, it is possible to suppress the occupation of the buffer memory 122 by a specific queue with a long queue length QLEN(N).

FIG. 10 is an explanatory drawing showing an example of a second congestion control table 126b with the second embodiment. In the second congestion control table 126b with the second embodiment are stored the maximum storage threshold value MAX_TH(N+1) representing the maximum packet count that can be stored in the (N+1)-th stage queue (specifically, the entire buffer memory 122), and the queue length QLEN (N+1) showing the total packets stored in the N-th stage queue. Also, with this embodiment, stored in the second congestion control table 126b are four congestion notification threshold values TH#1 to TH#4 respectively set for congestion classes 1 to 4. As shown in FIG. 9, the congestion notification threshold values TH#1 to TH#4 have different values set for the respective congestion classes 1 to 4, and the higher priority the congestion class, the larger the value that is set.

Figure 11:
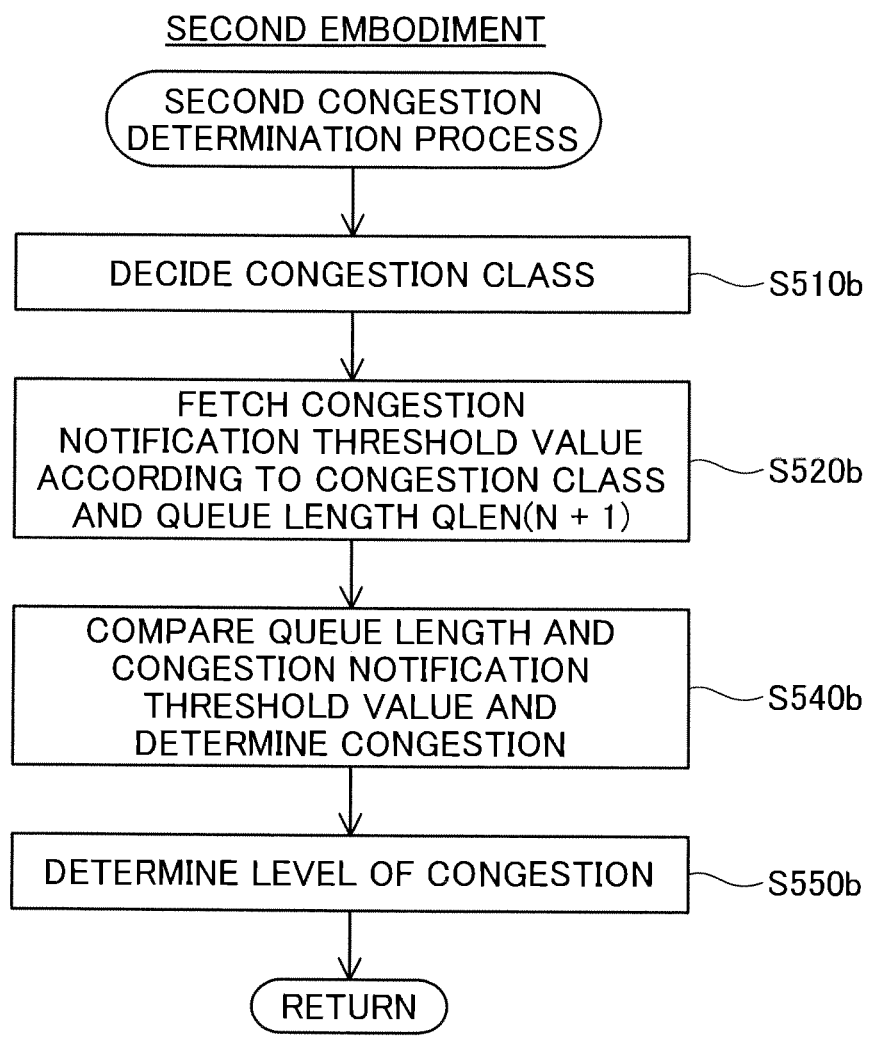
FIG. 11 is a flow chart of a second congestion determination process with the second embodiment.

FIG. 11 is a flow chart of a second congestion determination process with the second embodiment. When the second congestion determination process of this embodiment is started, the congestion notification determination unit 120 first decides on the congestion class (1 to 4) of that packet (step S510b) according to the queue length QLEN(N) of the N-th stage to which the received packet belongs. For the congestion class, it is possible, for example, to find the ratio of the queue length QLEN(N) in relation to the congestion notification threshold value CN_TH(N) (or the maximum storage threshold value MAX_TH(N)) set for that queue, and to make the decision according to that ratio, such as class 1 when the found ratio is up to 25%, class 2 when up to 50%, class 3 when up to 75%, and class 4 when 75% or greater.

When the congestion class is decided, the congestion notification determination unit 120 fetches the congestion notification threshold value correlated to the decided congestion class and the queue length QLEN(N+1) of the (N+1)-th stage queue from the second congestion control table 126b (step S520b) and compares these (step S540b). As a result of this comparison, when the queue length QLEN(N+1) is the congestion notification threshold value or greater according to the congestion class, the congestion notification determination unit 120 determines that the concerned queue is in a congested state, and decides to perform congestion notification. Meanwhile, when the queue length QLEN(N+1) is less than the congestion notification threshold value according to the congestion class, it determines that the concerned queue is not in a congested state. Finally, the congestion notification determination unit 120 finds the ratio of the queue length QLEN(N+1) in relation to the congestion notification threshold value, and determines the level of congestion according to that ratio (step S550b). With the series of processes described above, the second congestion determination process of the second embodiment ends, and the process returns to the congestion control process shown in FIG. 4.

With the second embodiment described above, the congestion class is decided by the queue length QLEN(N) of the N-th stage queue to which the packet belongs, and the congestion notification determination for the (N+1)-th stage queue is performed based on the congestion notification threshold value set for each of the concerned congestion classes and the queue length QLEN(N+1). In other words, it is possible to determine whether or not to perform congestion notification for each queue by a simple comparison of the queue length QLEN(N+1) and the threshold value according to the congestion class, so it is possible to exhibit the same effects as with the first embodiment while reducing the processing load of the packet relay device 100.

Note that the values of the congestion notification threshold values TH#1 to TH#4 shown in FIG. 10, the method of allocating the congestion class, and the number of congestion classes, can be set freely without being limited to the examples described above. It is also possible for the management user to set these freely using the management device 20 connected to the connection terminal 160.

C. Third Embodiment

With the first embodiment and the second embodiment, one packet relay device 100 is equipped with the first congestion control table 124 and the second congestion control table 126. In contrast to this, with the third embodiment, the first congestion control table 124 and the second congestion control table 126 are equipped in different packet relay devices.

Figure 12:
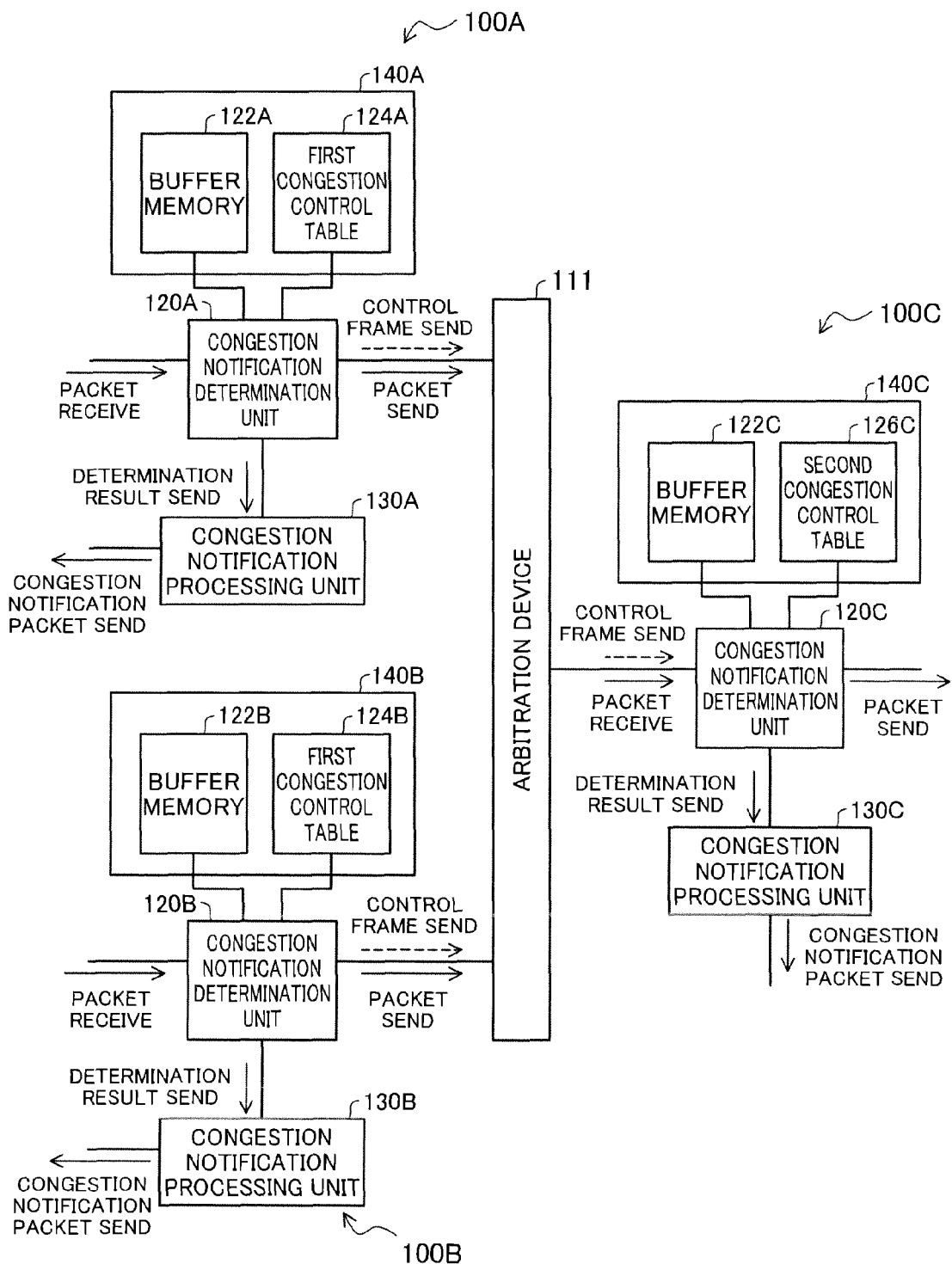
FIG. 12 is an explanatory drawing showing an example for which the first congestion control table and the second congestion control table are equipped in different packet relay devices.

FIG. 12 is an explanatory drawing showing an example for which the first congestion control table 124 and the second congestion control table 126 are equipped in different packet relay devices. With this embodiment, management of the N-th stage queue is performed by the packet relay devices 100A and 100B, and management of the (N+1)-th stage queue is performed by the packet relay device 100C. The packet relay devices 100A and 100B are connected to the packet relay device 100C via an arbitration device 111. The arbitration device 111 is a device for transferring control information sent from the packet relay devices 100A and 100B to the packet relay device 100C. Each packet relay device and the arbitration device can be connected by a network, or they can also be connected by a specified bus.

The packet relay devices 100A and 100B are equipped with buffer memories 122A and 122B and first congestion control tables 124A and 124B within the memory units 140A and 140B. Also, the packet relay device 100C is equipped with the buffer memory 122C and the second congestion control table 126C in the memory unit 140C. In other words, with this embodiment, an individual buffer method constitution for which buffer memory is divided physically is adopted. Note that the packet relay devices 100A and 100B can respectively manage different N-th stage queues.

Following, congestion control for this embodiment will be described. First, when the packet relay devices 100A and 100B receive packets, to which queue the concerned packet belongs is determined by the congestion notification determination units 120A and 120B. Then, the same processing as the first congestion determination process of the first embodiment described above is executed by the congestion notification determination units 120A and 120B. When it is determined by this first congestion determination process that the queue to which the received packet belongs is in a congested state, a congestion notification is given to the packet sending source from the congestion notification processing unit 130A and 130B. On the other hand, when it is determined that the received packet is not in a congested state, congestion notification is not given.

After the first congestion determination process, when the packets stored in the N-th stage queue are in the sequence in which they were sent, the data of those packets is read by the arbitration device 111, and also, the queue length QLEN(N) of the queues of that packet are read from the first congestion control table 124A or 124B, and sent to the packet relay device 100C. Simultaneous with this, the queue length QLEN (N) within the first congestion control tables 124A and 124B are reduced by one, and the queue length QLEN(N+1) of the second congestion control table 126C is increased by one. At the packet relay device 100C that received the packet and queue length QLEN(N), the same process as the second congestion determination process of the first embodiment described above is executed, and by doing this, a determination is made of whether or not to perform a congestion notification based on the (N+1)-th stage queue.

As with the third embodiment described above, even if constituted with the buffer memory physically divided by the N-th stage queue and the (N+1)-th stage queue, the same as with the shared buffer method of the first and second embodiments, it is possible to realize a congestion notification determination for the (N+1)-th stage queue reflecting the status of the N-th stage queue.

Note that with this embodiment, the individual buffer method is adopted for the plurality of packet relay devices. However, the individual buffer method can also be adopted for one packet relay device. In this case, all the constitutions shown in FIG. 12 are equipped with one packet relay device.

D. Fourth Embodiment

With each of the embodiments described above, it is possible to perform settings relating to the operation of the congestion notification determination unit 120 and settings of the control information within the first congestion control table 124 and the second congestion control table 126 using the management device 20 that is connected to the connection terminal 160. In light of this, specific examples of commands for performing these settings will be shown below.

FIG. 13 is an explanatory drawing showing commands for performing settings related to the operation of the congestion notification determination unit 120. FIG. 13 shows commands for setting the standard congestion notification probability STD_CP, the weighting factor S, the congestion notification probability weight $\alpha$, the congestion notification threshold value weight $\beta$, the number of congestion classes, and the threshold value for each congestion class. When it receives these commands from the management device 20, the congestion notification determination unit 120 performs settings of each control information according to the received commands. As shown in FIG. 13, commands for displaying these control information and commands for clearing them are also prepared.

FIG. 14 is an explanatory drawing showing commands for performing settings of the first congestion control table 124 and the second congestion control table 126. Shown in FIG. 14 are commands for setting each control information shown in FIG. 5 and FIG. 6 such as the number of N-th stage queues and the maximum congestion notification threshold value MAX_CN_TH(N+1) of the (N+1)-th stage queue. When it receives these commands from the management device 20, the congestion notification determination unit 120 performs setting of each control information within the first congestion control table 124 or the second congestion control table 126 according to the received commands. As shown in FIG. 14, commands for displaying these control information and commands for clearing them are also prepared.

As described above, by making it possible to freely set the settings related to the operation of the congestion notification determination unit 120 or the values within the first congestion control table 124 and the second congestion control table 126 using the management device 20 which is connected to the connection terminal 160, it is possible to realize detailed congestion control according to the number of terminals connected to the packet relay device 100 or the communication volume, the network status, the usage status of the packet relay device 100 or the like.

E. Variations

While several embodiments of the present invention have been shown above, the present invention is not limited to these embodiments, and it is possible to use various constitutions in a scope that does not stray from its gist. For example, the functions realized by software can also be realized using hardware, and conversely, the functions realized by hardware can also be realized by software. In addition, the following kinds of variations are possible.

Variation 1:

With each of the embodiments described above, the packets stored in the N-th stage queue or the (N+1)-th stage queue are managed by packet count. Specifically, each value stored in the first congestion control table 124 and the second congestion control table 126 respectively express numbers of packets. In contrast to this, each queue management can also be performed using communication volume (e.g. byte count).

Variation 2:

With each embodiment described above, constitutions having two stages of queues, the N-th stage queues and the (N+1)-th stage queues, have been described, but the present invention can also be applied in the same way for constitutions having three or more stages of queues. In specific terms, with the congestion notification determination of the packet for each stage queue, the congestion notification determination unit 120 performs congestion notification determination based on the control information of before the previous stage queue and the control information of that stage queue. For example, if there are a plurality of types of the first congestion control table 124 for managing the N-th stage queues, and one each of the second congestion control tables 126 for managing the (N+1)-th stage queues is prepared for the respective first congestion control tables 124, it is possible to further prepare a third congestion control table for managing these second congestion control tables 126 consolidated as the (N+2)-th stage queue. In this case, with the (N+1)-th stage queue, as with the first congestion control process described above, it is possible to perform congestion determination processing simply by comparing the (N+1)-th stage queue length with a specified threshold value, or as with the second congestion control process described above, it is also possible to perform congestion determination processing that reflects the queue status of the previous stage.

Variation 3:

With the first embodiment noted above, to which queue of the plurality of N-th stage queues the packet received by the packet relay device 100 belongs is determined by the congestion notification determination unit 120. However, this determination can also be performed by another device separate from the packet relay device 100. It is also possible to have it performed by a functional block or circuit different from the congestion notification determination unit 120.

Variation 4:

The formula for finding the congestion notification probability CP and the formula for finding the congestion notification probability weight $\alpha$ and the congestion notification threshold value weight $\beta$ with the aforementioned first embodiment are just examples, and as long as control information for the N-th stage queue is included as a parameter, other formulas can also be used. Also, the formula for finding the congestion notification probability CP and the congestion notification probability weight $\alpha$ and the congestion notification threshold value weight β, the constants included in these formulas, and the congestion notification threshold value set for each congestion class with the second embodiment can be changed by instructions from the management user via the management device 20, and can also be selected from among a plurality of choices prepared in advance. By working in this way, it is possible to suitably adjust the packet congestion notification determination method according to changes in the user count or communication volume.

Variation 5:

With the embodiments noted above, the management device 20 was connected to the connection terminal 160, and various settings were performed from this management device 20. In contrast to this, it is also possible to connect a display device such as a display or the like or an input device such as a keyboard or the like directly to the packet relay device 100, and to perform settings using these. Of course, it is also possible to have the packet relay device 100 itself equipped with a display device or input device.

What is claimed is:

1. A packet relay device comprising:
 a buffer memory containing a plurality of queues in which packets are temporarily stored, the plurality of queues being configured to be a multi-stage queue structure between a plurality of first queues and a second queue;
 a storage unit in which a plurality of first queue lengths respectively indicating a queue length of each of the first queues, and a second queue length indicating a value of the second queue according to a total of the plurality of first queue lengths, are stored;
 a receiving unit configured to receive packets;
 a queue discerning unit configured to discern a queue to which a packet belongs from among the plurality of the queues;
 a queue management unit configured to temporarily store the packets for the discerned queue within the buffer memory, and to update the first queue length and the second queue length;
 a congestion notification determination unit configured to determine whether or not to send a congestion notification to a sending source of a respective one of the received packets according to both the first queue length corresponding to the discerned queue and the second queue length; and
 a congestion notification sending unit configured to send the congestion notification to the sending source.

2. The packet relay device according to claim 1, wherein the congestion notification determination unit is configured:
 to find a congestion notification probability for which the probability becomes higher the longer the first queue length is and becomes higher the longer the second queue length is based on a specified arithmetic expression, and
 to determine whether or not to send the congestion notification to the sending source of the received packet based on that congestion notification probability.

3. The packet relay device according to claim 2, wherein the congestion notification determination unit is configured to make the congestion notification probability 0% regardless of the arithmetic expression when the second queue length is a preset first threshold value or less, and is configured to make the congestion notification probability 100% regardless of the arithmetic expression when the second queue length is a preset second threshold value or greater.

4. The packet relay device according to claim 2, further comprising: a first setting unit configured to set the arithmetic expression or constants contained in the arithmetic expression.

5. The packet relay device according to claim 1, wherein the congestion notification determination unit is configured to classify the received packets into classes according to the first queue length, and is configured to determine whether or not to send the congestion notification to the sending source of the received packet based on a preset threshold value for each of the classes and on the second queue length.

6. The packet relay device according to claim 5, further comprising: a second setting unit configured to set the threshold value for each of the classes.

7. The packet relay device according to claim 1, wherein the storage unit is configured to store the first queue length and the second queue length by the number of packets or data volume.

8. The packet relay device according to claim 1, wherein the congestion notification determination unit is configured to determine a congestion level according to the second queue length, and
 the congestion notification sending unit is configured to include the determined congestion level in the congestion notification.

9. The packet relay device according to claim 8, wherein the congestion level is used for restricting the packet sending volume at the sending source.

10. The packet relay device according to claim 1, wherein a total capacity of the buffer memory is lower than a total of the queue lengths of the plurality of the queues.

11. A method for a packet relay device to perform congestion control,
 the packet relay device comprising:
 a buffer memory containing a plurality of queues in which packets are temporarily stored, the plurality of queues being configured to be a multi-stage queue structure between a plurality of first queues and a second queue; and
 a storage unit in which a plurality of first queue lengths respectively indicating a queue length of each of the first queues and a second queue length indicating a value of the second queue according to a total of the plurality of first queue lengths are stored, and
 the method comprising:
 receiving packets;
 discerning a queue to which a respective one of the packets belongs from among the plurality of the queues;
 temporarily storing the packets in the discerned queue within the buffer memory,
 updating the first queue length and the second queue length;
 determining whether or not to send a congestion notification to a sending source of the received packet according to both the first queue length corresponding to the discerned queues and the second queue length; and
 sending the congestion notification to the sending source.

* * * * *